United States Patent [19]

Kohara et al.

[11] Patent Number: 4,870,042

[45] Date of Patent: Sep. 26, 1989

[54] CATALYST FOR OLEFIN POLYMERIZATION

[75] Inventors: Tadanao Kohara, Kanagawa; Satoshi Ueki, Saitama, both of Japan

[73] Assignee: Toa Nenryo Kogyo K.K., Tokyo, Japan

[21] Appl. No.: 254,988

[22] Filed: Oct. 7, 1988

[30] Foreign Application Priority Data

Oct. 8, 1987 [JP] Japan .................. 62-252424

[51] Int. Cl.$^4$ ................................ C08F 4/64
[52] U.S. Cl. .................... 502/114; 502/113; 502/117; 502/120; 502/123
[58] Field of Search ............ 502/113, 114, 117, 120, 502/123

[56] References Cited

U.S. PATENT DOCUMENTS

| | | | |
|---|---|---|---|
| 3,655,793 | 4/1972 | Myers | 502/114 X |
| 3,947,507 | 3/1976 | Isa et al. | 502/114 X |
| 4,701,432 | 10/1987 | Welborn | 502/114 X |

Primary Examiner—Patrick P. Garvin
Attorney, Agent, or Firm—M. B. Kurtzman

[57] ABSTRACT

A catalyst for olefin polymerization which comprises:
(A) a catalyst component obtained by reacting (a) alkali metal boron hydride represented by the formula $MBH_4$ (where M denotes an alkali metal) with (b) pyrazole and subsequently reacting the reaction product with (c) a titanium compound or zirconium compound, and
(B) aluminoxane.

7 Claims, No Drawings

CATALYST FOR OLEFIN POLYMERIZATION

FIELD OF INDUSTRIAL APPLICATION

The present invention relates to a catalyst for olefin polymerization comprising (A) a catalyst component obtained by reacting (a) alkali metal boron hydride represented by the formula $MBH_4$ (where M denotes an alkali metal) with (b) pyrazole and subsequently reacting the reaction product with (c) a titanium compound or zirconium compound, and (B) aluminoxane. The invention further relates to the process of polymerizing alpha-olefins in the presence of said catalyst.

PRIOR ART

Heretofore, a variety of hydropyrazolyl borate metal complexes have been synthesized and they are known to be effective for several chemical reactions. However, no instances have been reported in which the metal complex is employed as a catalyst component for olefin polymerization.

SUMMARY OF THE INVENTION

It is an object of the present invention to provide a catalyst for olefin polymerization which is based on a hydropyrazolyl borate metal complex.

The present inventors found that a catalyst formed by the combination of a zirconium or titanium complex containing as the ligand hydropyrazolyl borate synthesized from an alkali metal boron hydride and pyrazole and aluminoxane has an ability to polymerize olefins. This finding led to the present invention.

The gist of the present invention therefore resides in a catalyst for olefin polymerization which comprises:

(A) a catalyst component obtained by reacting (a) an alkali metal boron hydride represented by the formula $MBH_4$ (wherein M denotes an alkali metal) with (b) pyrazole and subsequently reacting the reaction product with (c) a Group IVb (Periodic Table—Handbook of Chemistry and Physics, 49th Edition, The Chemical Rubber Co., Cleveland, Ohio) metal compound, preferably a titanium compound or zirconium compound, and (B) an aluminoxane.

DETAILED DESCRIPTION OF THE INVENTION

Preparation of Catalyst Component

The catalyst component pertaining to the present invention is obtained by reacting alkali metal boron hydride (referred to as component (a) hereinafter) represented by the formula $MBH_4$ (where M denotes an alkali metal) with pyrazole (referred to as component (b) hereinafter), and subsequently reacting the reaction product with a Group IVb metal compound and preferably a titanium compound or zirconium compound (referred to as component (c) hereinafter).

(1) Reaction of component (a) with component (b)

Component (a) is a compound represented by the formula $MBH_4$. It includes, for example, $LiBH_4$, $NaBH_4$, $KBH_4$, $RbBH_4$, and $CsBH_4$. $KBH_4$ is most desirable among them.

The reaction of component (a) with component (b) takes place according to the following reaction formula.

$$MBH_4 + nPzH \longrightarrow M^+[H_{4-n}B(Pz)_n]^- + nH_2$$

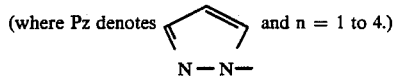

(where Pz denotes  and n = 1 to 4.)

The reaction of component (a) with component (b) is accomplished by mixing and stirring them at 50° to 250° C. for 1 to 20 hours. The progress of the reaction can be properly controlled by measuring the amount of hydrogen liberated by the reaction.

(2) Reaction with component (c)

Component (c), which is a titanium compound or zirconium compound, includes titanium tetrahalide and zirconium tetrahalide represented by the formulas below.

$TiCl_4$, $TiBr_4$, $TiI_4$, $ZrCl_4$, $ZrBr_4$, and $ZrI_4$.

$TiCl_4$ and $ZrCl_4$ are particularly preferable among them.

The hydropyrazolyl borate alkali metal complex obtained in the step (1) above is subsequently reacted with component (c). This reaction is usually carried out in a solvent. Examples of the solvent include ethers such as tetrahydrofuran, diethyl ether, and dioxane, and aromatic hydrocarbons such as benzene, toluene, and xylene.

The reaction is performed at $-10°$ C. to $+150°$ C. for 1 to 20 hours. The amount of component (c) should be 0.2 to 2 mol for 1 mol of the complex.

The catalyst component pertaining to the present invention can be prepared as mentioned above. The catalyst component may be brought into contact with a metal oxide.

The metal oxide that can be used for this purpose is an oxide of an element selected from Groups II to IV of the periodic table. Examples of the metal oxide include $B_2O_3$, $MgO$, $Al_2O_3$, $SiO_2$, $CaO$, $TiO_2$, $ZnO$, $ZrO_2$, $SnO_2$, $BaO$, and $ThO_2$. Preferable among them are $B_2O_3$, $MgO$, $Al_2O_3$, $SiO_2$, $TiO_2$, and $ZrO_2$. Particularly desirable are $Al_2O_3$ and $SiO_2$. These metal oxides can also be used in the form of compound oxide such as $SiO_2$-$MgO$, $SiO_2$-$Al_2O_3$, $SiO_2$-$TiO_2$, $SiO_2$-$V_2O_5$, $SiO_2$-$Cr_2O_3$, and $SiO_2$-$TiO_2$-$MgO$.

The above-mentioned metal oxides and compound oxides should preferably be in the form of anhydride in principle; but they may contain a trace amount of hydroxide which is present under normal conditions.

The metal oxide should be calcined at as high a temperature as possible prior to use in order to remove poisonous substances, and, after calcination, it should be kept away from air.

The contacting of said catalyst component with a metal oxide is usually achieved in an inert hydrocarbon such as hexane, heptane, cyclohexane, benzene, toluene, and xylene at a temperature in the range of room temperature to the boiling point of the hydrocarbon for 0.5 to 20 hours. The amount of the metal oxide is 1 to 500 parts by weight for 1 part by weight of said catalyst component.

Aluminoxane

Aluminoxane is a compound represented by the formula below.

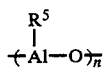

(where $R^5$ denotes a hydrocarbyl group having 1 to 8 carbon atoms and n is a positive integer of from 4 to about 26 and preferably 14—20.) It is usually produced by reacting an organoaluminum compound of the formula $AlR_3^5$ with water.

Examples of the organoaluminum compound include trimethyl aluminum, triethyl aluminum, triisobutyl aluminum, trihexyl aluminum, trioctyl aluminum, and triphenyl aluminum. Trimethyl aluminum is particularly preferable.

The organoaluminum compound can be reacted with not only ordinary water but also water of crystallization in iron sulfate or copper sulfate.

The catalyst of the present invention is composed of the catalyst component and aluminoxane prepared as mentioned above. The ratio of the two components is such that the amount of aluminoxane is 1 to $10^6$ gram-atom (in terms of aluminum) for 1 gram-atom of titanium or zirconium in the catalyst component.

Polymerization of Olefins

The catalyst of the present invention can be used for the homopolymerization of α-olefin such as ethylene, propylene, 1-butene, 1-hexane, 4-methyl-1-pentene, and 1-octene and also for the copolymerization of said α-olefin with other olefins.

The polymerization reaction may be accomplished in either gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in a liquid monomer. The polymerization temperature is usually in the range of $-80°$ C. to $+150°$ C., preferably 40° to 120° C. The polymerization pressure is, for example, 1 to 60 atm. The molecular weight of the polymer can be properly regulated by the aid of hydrogen or any other known molecular weight modifier added to the polymerization system. In the copolymerization, a major olefin is copolymerized with other minor olefin in an amount up to 30 wt %, preferably from 0.3 to 15 wt %, of the major olefin. The catalyst of the present invention is used for polymerization reaction which is carried out continuously or batchwise under normal conditions. The copolymerization may be carried out in a single step or in two or more steps.

Effect of the Invention

The catalyst of the present invention is based on a hydropyrazolyl borate complex, and it enables the polymerization of olefins.

EXAMPLE 1

Preparation of Catalyst Component

One mol of $KBH_4$ was mixed with 4 mol of pyrazole, and the mixture was heated at 90° to 100° C. (for 6 hours). When 2 mol of hydrogen was liberated, the molten reaction product was put in toluene and insoluble matters were filtered off. The solids were washed with toluene and n-hexane and dried in vacuo. Thus there was obtained a product $\{K^+[H_2B(Pz)_2]^-\}$ having a melting point of 169° C. The yield was 54 mol %.

The thus obtained product (2.26 g) was dissolved in toluene. To the toluene solution was slowly added dropwise 0.7 ml of $TiCl_4$ at room temperature. The reaction was performed for 2 hours at the refluxing temperature. The solid reaction product was filtered off to give a yellowish green solution. The solution was freed of solvent by distillation. Thus there was obtained the catalyst component in the form of yellowish crystals. The yield was 15 mol %.

Polymerization of Ethylene

In a 1-liter glass autoclave, with the atmosphere therein replaced with nitrogen gas, were placed 50 mg of the catalyst component obtained as mentioned above, aluminoxane (10 miligram-atom as aluminum), and 250 ml of toluene. (The aluminoxane is one which was synthesized from trimethyl aluminum and $CuSO_4.5H_2O$.) Into the autoclave was introduced ethylene gas. The polymerization of ethylene was performed at 50° C. for 1 hours. The catalytic activity was 86 g/g-Ti.atm.hour.

EXAMPLE 2

Preparation of Catalyst Component $K[H_2B(Pz)_2]$ (4.7 g) synthesized in the same manner as in Example 1 was dissolved in THF (tetrahydrofuran). To the THF solution was added 2.3 g of $ZrCl_4$, followed by reaction for 12 hours at the refluxing temperature. Solids were filtered off and the filtrate was partly freed of solvent. To the condensed filtrate was added toluene to cause solids to separate out. The solids were filtered off and the filtrate was freed of solvent. White solids which had separated out were dried under reduced pressure. Thus there was obtained 0.51 g of catalyst component. The yield in terms of $Zr[H_2B(Pz)_2]_2Cl_2$ was 13 mol %.

Polymerization of Ethylene

The polymerization of ethylene was performed in the same manner as in Example 1, except that the catalyst component obtained as mentioned above was used. The catalytic activity was 45 g/g.Zr.atm.hour.

EXAMPLE 3

Preparation of Catalyst Component

One mol of $KBH_4$ was mixed with 3 mol of pyrazole, and the mixture was heated at 90° to 100° C. When 1.5 mol of hydrogen was liberated, the temperature of the reactants was slowly raised to 190° C. When 3 mol of hydrogen was liberated, the reactants were cooled to 150° C. The molten reaction product was put in toluene and insoluble matters were filtered off, washed, and dried in the same manner as in Example 1. Thus there was obtained a product $\{K^+[HB(Pz)_3]^-\}$ having a melting point of 188° C. The yield was 48 mol %.

The thus obtained product (0.0182 mol) was dissolved in THF. To the THF solution was added dropwise 0.0182 mol of $TiCl_4$ at 0° C. The reaction was performed for 12 hours at the refluxing temperature. The yellowish solid reaction product was filtered off, washed, and dried. Upon sublimation at 180° C., there was obtained a yellowish green catalyst component. The yield was 30 mol %. This catalyst component was stable in air.

Polymerization of Ethylene

The polymerization of ethylene was performed in the same manner as in Example 1, except that the catalyst component obtained as mentioned above was used. The catalytic activity was 192 g/g.Ti.atm.hour.

EXAMPLE 4

Preparation of Catalyst Component

K[HB(Pz)$_3$](1.14 g) synthesized in the same manner as in Example 3 was dissolved in THF. To the THF solution was added a THF slurry containing 1.84 g of TiCl$_3$ at room temperature, followed by reaction for 2 hours at the refluxing temperature. The solution turned violet, and violet solids separated out. The solids were filtered off and dissolved in acetonitrile. KCl separated out. The KCl was filtered off and the filtrate was partly freed of solvent. To the condensed filtrate was added diethyl ether and n-hexane to cause blue crystals to separate out. Thus there was obtained a catalyst component in a yield of 30 mol %.

Polymerization of Ethylene

The polymerization of ethylene was performed in the same manner as in Example 1, except that the catalyst component obtained as mentioned above was used. The catalytic activity was 27 g/g.Ti.atm.hour.

We claim:

1. A catalyst comprising (i) a catalyst component obtained by reacting (a) an alkali metal boron hydride with (b) pyrazole and contacting the product therefrom with (c) a Group IVb metal compound, and (ii) and aluminoxane.

2. The catalyst in accordance with claim 1 wherein the alkali boron hydride is represented by the formula MBH$_4$ wherein M denotes an alkali metal.

3. The catalyst in accordance with claim 2 wherein the Group IVb metal is selected from zirconium and titanium.

4. The catalyst in accordance with claim 2 wherein the Group IV metal compound is a titanium halide or a zirconium halide.

5. The catalyst in accordance with claim 3 wherein the Group IV metal compound is a titanium halide or a zirconium halide.

6. The catalyst in accordance with claim 2 further characterized in being supported on a metal oxide.

7. The catalyst in accordance with claim 5 wherein the catalyst component is supported on the metal oxide.

* * * * *